United States Patent
Esseling et al.

(10) Patent No.: US 8,218,441 B2
(45) Date of Patent: Jul. 10, 2012

(54) METHOD FOR CONTROLLING RESOURCES IN NETWORK ELEMENTS OF A TELECOMMUNICATION NETWORK

(75) Inventors: Ute Esseling, Bonn (DE); Stefan Koppenborg, Bottrop (DE); Frank Lehser, Bonn (DE)

(73) Assignee: T-Mobile International AG & Co. KG, Bonn (DE)

( * ) Notice: Subject to any disclaimer, the term of this patent is extended or adjusted under 35 U.S.C. 154(b) by 535 days.

(21) Appl. No.: 11/996,863

(22) PCT Filed: Jul. 13, 2006

(86) PCT No.: PCT/DE2006/001215
§ 371 (c)(1),
(2), (4) Date: Aug. 11, 2008

(87) PCT Pub. No.: WO2007/012304
PCT Pub. Date: Feb. 1, 2007

(65) Prior Publication Data
US 2009/0154402 A1 Jun. 18, 2009

(30) Foreign Application Priority Data
Jul. 25, 2005 (DE) .......................... 10 2005 035 237

(51) Int. Cl.
*G01R 31/08* (2006.01)
*G06F 11/00* (2006.01)
*H04J 1/16* (2006.01)
*H04J 3/14* (2006.01)

(52) U.S. Cl. .................. 370/235; 370/236; 370/252
(58) Field of Classification Search .............. 370/329, 370/389, 392, 236, 252, 400–401; 455/450
See application file for complete search history.

(56) References Cited

U.S. PATENT DOCUMENTS

| 6,023,456 | A | 2/2000 | Chapman et al. |
| 6,459,682 | B1 | 10/2002 | Ellesson et al. |
| 2004/0109455 | A1 | 6/2004 | Jouppi et al. |
| 2004/0258003 | A1* | 12/2004 | Kokot et al. ................. 370/254 |
| 2007/0230342 | A1* | 10/2007 | Skog ............................ 370/232 |
| 2010/0215015 | A1* | 8/2010 | Miao et al. ................... 370/329 |
| 2010/0238915 | A1* | 9/2010 | Cayla et al. .................. 370/346 |

FOREIGN PATENT DOCUMENTS

| DE | 103 55 117 A1 | 7/2005 |
| EP | 1 154 664 A1 | 11/2001 |
| FR | 2 852 178 A1 | 9/2004 |

OTHER PUBLICATIONS

PCT International Search Report received Dec. 1, 2006.
Deutsches Patent- und Markenamt Examination Report dated Jun. 20, 2006.

* cited by examiner

*Primary Examiner* — Chi Pham
*Assistant Examiner* — Farah Faroul
(74) *Attorney, Agent, or Firm* — Browdy and Neimark, PLLC (57) ABSTRACT

The invention relates to a method for controlling resources in network elements of a communication network, in particular a data network or a mobile data network. The idea of the invention is the use of a data packet inspection for the Quality of Service (QoS) control in telecommunication networks. Based on information obtained from data packets, a network resource corresponding to the content of each data packet is provided in the network elements. A dynamic allowance for services and customer classes or quality and resource control is a novel possibility by means of the above application of packet inspection.

7 Claims, 7 Drawing Sheets

METHOD FOR CONTROLLING RESOURCES IN NETWORK ELEMENTS OF A TELECOMMUNICATION NETWORK

The invention relates to a method for controlling resources in network elements of a telecommunication network, in particular a data network, such as the Internet or a mobile data network, such as the General Packet Radio Service (GPRS) in the Global System of Mobile Communication (GSM) and the Universal Mobile Telecommunication System (UMTS) networks.

BACKGROUND OF THE INVENTION

The present state of the art for controlling resources in network elements of a GPRS data network is described in the specification of the 3GPP Standard, such as 3GPP TS 23.107, 3GPP 23.060, and 3GPP 24.008. It proposes quasi-static parametrizing of a logical data connection, on the assumption that all the data packets at this connection have the same importance. The logical connection is equivalent to the PDP Context. The quasi-static behavior becomes possible by modifying the parametrizing, but the trigger points are not defined. Connected to each PDP Context of a GPRS data service, there are QoS (Quality of Service) parameters, which define the transmission property of the data service. Depending on the communication standard (such as IP or GSM, UMTS), different parameters are used for defining and measuring the Quality of Service (QoS). In GSM and UMTS mobile radio, for example, four QoS classes of communication have been defined:

SUMMARY OF THE INVENTION

"Background" for data transfer with the lowest possible error rate but with noncritical requirements in terms of bandwidth, delay, and jitter.

"Interactive" (IA) for using interactive services requires similar demands as in background, but makes higher demands in terms of delay, to avoid waiting times in using the services.

"Streaming" for distribution services. A minimum bandwidth is required; jitter is allowed to a certain extent, since jitter buffers are used on the receiver end. Bit errors are not so critical.

"Conversational" for direct communication (by telephone or video telephone). Similar requirements as in streaming, but the requirements in terms of delay and jitter are markedly stricter.

For defining these classes, QoS parameters with different characteristics are defined for instance in GPRS Five (Rel.97) and 12 (Rel.99). Some of these are excerpted below as examples:

Delay: For the delay of GPRS packets, a plurality of classes are defined that define the duration of transmission between the GPRS access points.

Urgency: The urgency defines the relative importance with which, even in especially critical situations and conditions, the transmission parameters must be adhered to.

Reliability: This has to do with the residual error probability of a data service meeting certain service criteria.

Peak throughput: This defines the maximum data rate to be expected for a particular PDP Context, but without guaranteeing that this data rate is in fact attained.

Average throughput: Here the same is true as for the peak throughput rates, except that this involves rates averaged over time, or in other words average rates.

In connection with the Internet, known methods for assuring a "Quality of Service" (QoS) are employed, defined among other places in ITU-T Recommendation I.380 on IP Performance (ITU-T I.380): Integrated Services (IntServ) and Differentiated Services (DiffServ).

Other known implementations are the following:

Packet inspection: Examination of the data packets for billing purposes or the like (that is, thus far for other functions as quality and resource control).

Blocking of unwanted data traffic in IP-based networks ("firewall functionality").

The object of the invention is to improve the resource control in a limited capacity telecommunication system in comparison to the known methods.

This object is attained according to the invention by the characteristics of the independent claims.

Preferred features and advantageous refinements of the invention are defined by the dependent claims.

According to the invention, because for the first the inspection of data packets and the existing Quality of Service (QoS) mechanisms of the Internet and mobile radio (3GPP) are combined, better resource distribution is achieved. Thus for the first time, an end-to-end furnishing of QoS over network and technology boundaries is achieved, which until now was not possible.

The nucleus of the invention is utilizing a data packet inspection for the QoS control in telecommunication networks. Until now, packet inspection in telecommunication networks was used only for billing purposes. With the use of packet inspection according to the invention, it is possible for the first time to take services and customer classes into account for quality and resource control.

In a preferred feature of the invention, the control can be shifted entirely to the network operator. The resource control procedures in mobile radio networks are optimized to data flows and give part of the control to the mobile stations, which has the potential for misuse. With the introduction of resource control based on the outcome of the packet inspection, the control can be shifted completely to the network. As a result, on the one hand, possible misuse can be prevented, and on the other, the network operator is given the capability of defining the criteria for the resource control, for instance via parameter settings.

Another feature of the invention provides for an improvement in the latency times. This has do with an improvement in the reaction times for the resource adaptation in those portions of the embodiment that make decisions based on the packet, since in that case signalling and reconfiguration times are omitted, for instance. This improvement is especially favorable for the communication customer, since latency times for prioritized services or preferred customer classes are shortened.

Based on information obtained from the data packets, resources are made available in accordance with the significance of the respective data packet in the network elements of a (mobile radio) network.

A network element inspects and classifies the data packets in accordance with the importance, for instance of the service and/or of the user. The classification related to the importance of the data packet is forwarded by suitable signalling to other network elements involved. The network elements involved take this signalling into account, in such a way that dynamic resource control is achieved.

The rules for classifying a data packet or data flow in accordance with its importance are stored in memory in the network elements that are responsible for the inspection. The importance assigned to a data packet or a data flow is transmitted among the network elements involved by signalling. The rules for converting the signalled significance of a data packet or a data flow in the network elements involved are stored in memory in those elements. The set of rules relating to inspection, signalling and conversion can be administered in a network operator-specific way.

With this novel way of improving resource control, for the first time the outcome of the packet inspection is used, and the control can take place by way of the following:

a) properties of a packet connection (PDP Context), with the advantage that the network operator gains complete control over the strategy of the resource control and thus misuse by the user can also be prevented.

b) the identification of individual packets within a packet connection, with the advantage that a compulsory change of the connection parameters for the entire data flow is not necessary. The identification is created from a classification which:

1) takes place in a network element at the network boundary and by way of the identification is signalled to further network elements involved.
2) takes place independently in individual network elements or in each network element. In this case, the identification is implementation-dependent.

c) via a combination of the aforementioned variants, the advantage of a highly dynamic adaptation of relative priorities by way of the data packet identification and an additional adaptation of the logical connection upon changes in absolute parameters.

Preferred exemplary embodiments of the invention are described below in conjunction with the drawings. Shown are.

BRIEF DESCRIPTION OF THE DRAWINGS

In the following exemplary drawing figures, the resource to be controlled is represented by bars of different widths. The resource shown increases in proportion to the width of the bar with respect to data throughput and delay behavior.

DETAILED DESCRIPTION OF THE INVENTION

Exemplary Embodiment for Version a):

Before a data transmission is started, the mobile station initiates the making of a logical connection with the data network (PDP Context). The procedure used and the behavior of the network elements until the callup of the network transition node (GGSN) is in accordance with the 3GPP standard; see FIG. 1, steps 2-4. In step 1, FIG. 1, subscriber data are called up by the switching node (SGSN) from the home location register marked HLR 23 and stored in memory. In step 2, FIG. 1, a PDP Context query for a requested QoS profile is activated (req. QoS, primarily for "booked" services). In step 3, FIG. 1, the allowed QoS profile of the subscriber is ascertained by the SGSN; the allowed QoS profile is defined as follows: allowed QoS=Min (requested QoS, subscribed QoS). In step 4, FIG. 1, a corresponding PDP Context Request is now generated.

Figure 1:
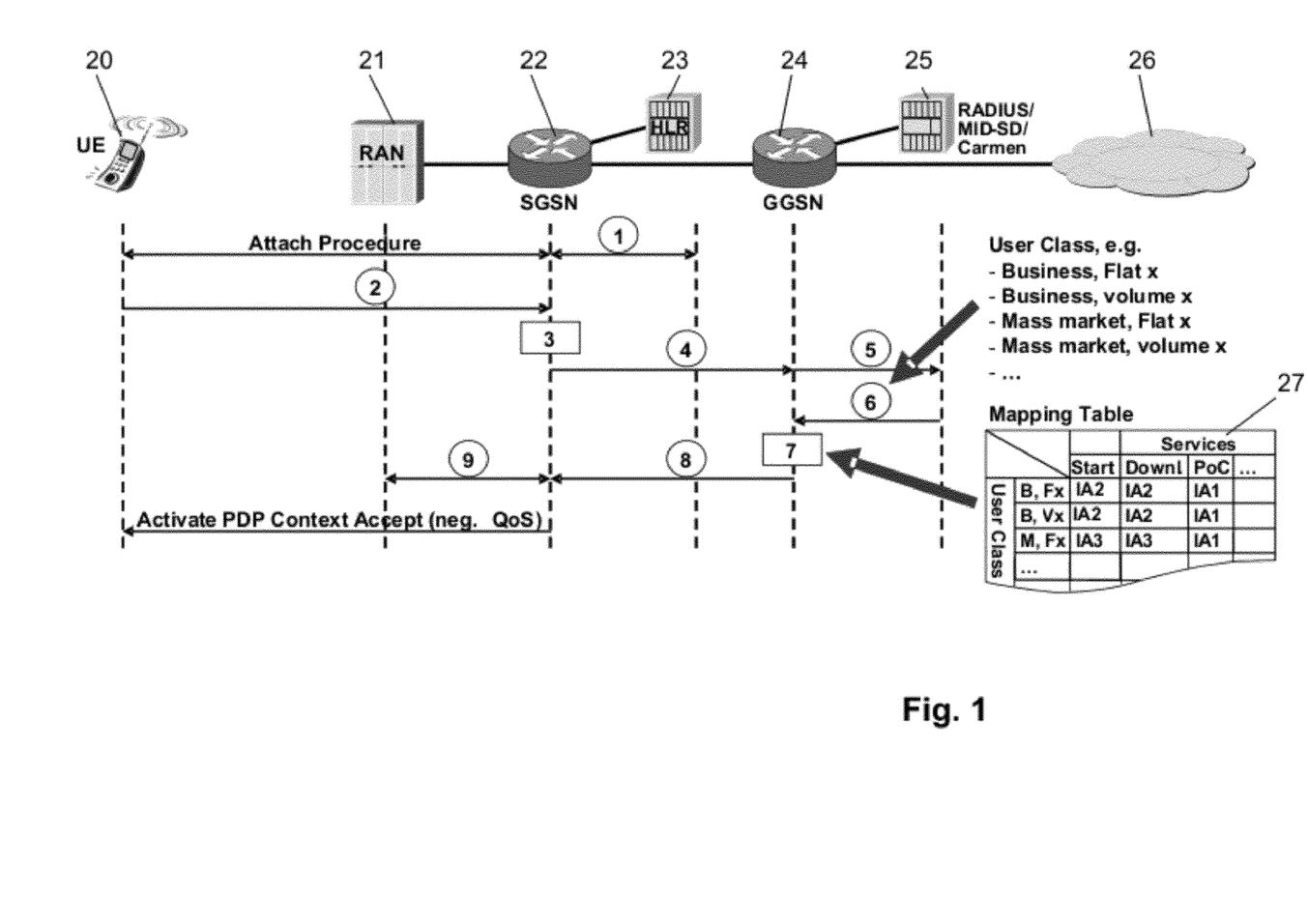
FIG. 1, the fundamental signalling flow for making a logical connection (GPRS: PDP Context)

After that, in steps 5 and 6, FIG. 1, the network transition node GGSN 24 calls up authentication data and customer data, including the customer class, from billing and other database systems 25, such as RADIUS, MID-SD. In step 7, FIG. 1, the GGSN 24, on the basis of the customer class from a table 27 that can be configured by the network operator, ascertains the starting configuration, stored in memory, of the quality parameters for that customer. Next, the GGSN 24 forwards the newly determined quality parameters back to the switching node SGSN 22 (step 8, FIG. 1), which thereupon negotiates these quality parameters with the radio system RAN 21 (step 9, FIG. 1). During this negotiation portion, the RAN 21 makes a partial logical connection of the PDP Context, which is a Radio Access Bearer (RAB), to the mobile station 20. The outcome of the negotiation between RAN 21 and SGSN 22 represents the quality parameters (QoS class) finally negotiated for the logical connection (PDP Context), which the SGSN 22 imparts to the mobile station 20. Now, the actual data transfer between the mobile station 20 and a server is possible. In the following example, it will be assumed that for the data transfer, a QoS class called "interactive", with a priority of "3", or "IA3" for short, has been negotiated.

Figure 2:
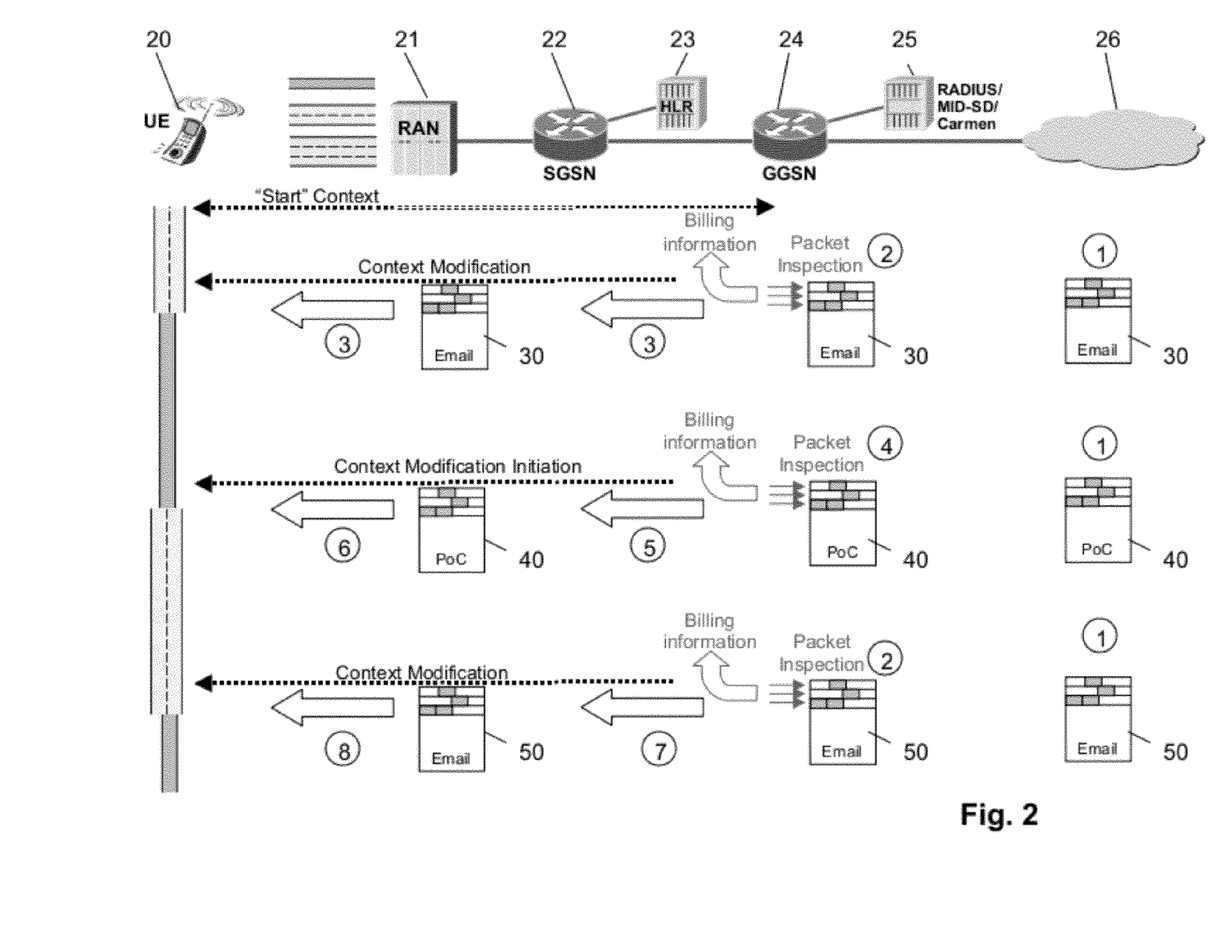
FIG. 2, basic sequence for attaining a first exemplary embodiment of the invention (version a))
Figure 3:
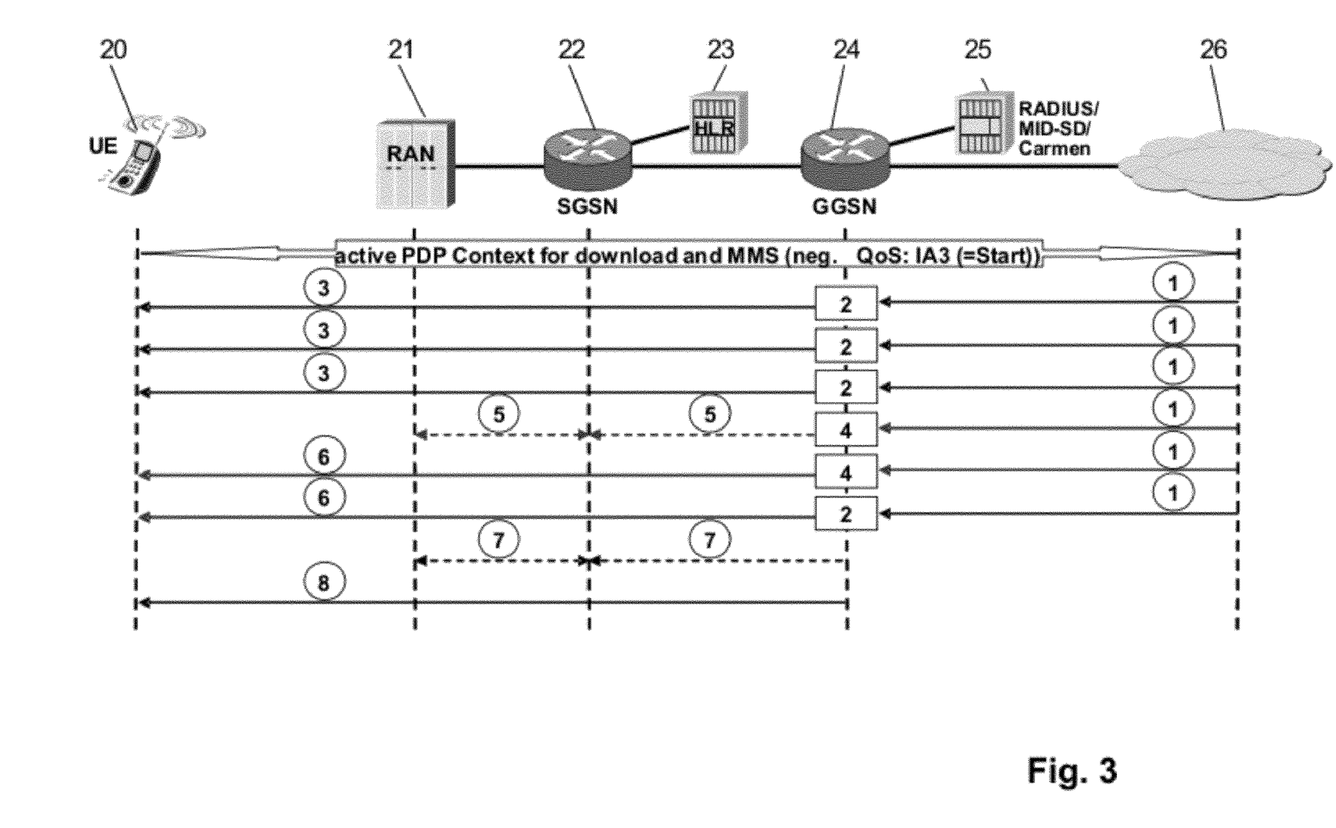
FIG. 3, signalling for version a)

The invention now provides that the network transition node GGSN 24 inspects the data packets during the data transmission and checks for possible criteria for a required adaptation of the quality parameters of the logical connection. The sequence of this procedure is shown in FIGS. 2 and 3.

A data packet of QoS class "IA3", such as an email data packet 30, is to be delivered to the subscriber end unit 20 of a GPRS data network (21-25). The data packet 30 reaches a network transition node GGSN 24 of the data network (step 1, FIGS. 2 and 3). In the GGSN 24, an inspection of the data packet 30, and in particular of the packet header, takes place (step 2, FIGS. 2 and 3). It is found that the data packet 30 corresponds to the negotiated QoS class "IA3". No adaptation of the quality parameters is necessary. In step 3, the data packet can be delivered to the receiver 20 (step 3, FIGS. 2 and 3). An adaptation is necessary according to the invention if the classification of the data packet for the service ascertained and for the customer class in accordance with a table that is configurable by the network operator shows a difference between the ascertained and the actually set quality parameters (3GPP QoS parameters) for the logical connection.

In addition, a data packet of the QoS class "IA1", such as a PoC data packet 40, is to be delivered to the subscriber end unit 20. The data packet 40 reaches a network transition node GGSN 24 of the data network (step 1, FIGS. 2 and 3). In the GGSN 24, an inspection of the data packet 40, in particular of the packet header, takes place. It is found that the data packet 40 does not correspond to the QoS class "IA3" negotiated beforehand (step 4, FIGS. 2 and 3). According to the invention, an adaptation of the QoS class is necessary, since the classification of the data packet for the service ascertained and for the customer class deviates from the negotiated QoS class. A required reconfiguration of the quality parameters of the logical connection is negotiated anew with all the network elements involved, such as the switching node SGSN 22 and the radio system RAN 21. This negotiation also includes the adaptation of the RAB between RAN 21 and the end unit 20 via an RAB MODIFICATION (step 5, FIGS. 2 and 3). Once the negotiation has been successfully concluded, the RAN 21 will take the new parameters into account for the ongoing data connection in the resource allocation. The end unit 20 is informed of the change by way of a PDP CONTEXT MODIFICATION. The adaptation of the quality parameters for the logical connection takes place parallel to the further data transmission (step 6, FIGS. 2 and 3).

Finally, another data packet of QoS class "IA3", such as an email data packet 50, is to be delivered to the subscriber end unit 20.

The data packet 50 reaches a network transition node GGSN 24 of the data network (step 1, FIGS. 2 and 3). In the GGSN 24, an inspection of the data packet 50, in particular the packet header, takes place. It is found that the data packet 50 matches the QoS class "IA3" (step 2, FIGS. 2 and 3). Once again, an adaptation of the QoS class from "IA1" to "IA3" is necessary, since the classification of the data packet 50 for the ascertained service and for the customer class differs from the previous QoS class. A necessary reconfiguration of the quality parameters of the logical connection is negotiated anew with all the network elements involved, such as the switching node SGSN 22 and the radio system RAN 21. This negotiation again includes the adaptation of the RAB between RAN 21 and the end unit 20 via an RAB MODIFICATION (step 7, FIGS. 2 and 3). Once the negotiation has been successfully concluded, the RAN 21 will take the new parameters into account for the ongoing data connection in the resource allocation. The end unit 20 is informed of the change by a PDP CONTEXT MODIFICATION. The adaptation of the quality parameters for the logical connection takes place parallel to the further data transmission (step 8, FIGS. 2 and 3).

To avoid oscillation events, a hysteresis mechanism is employed, so that a change in the quality parameters is not made until a stable estimate of the ascertained service and QoS class is available.

Exemplary Embodiment for Version b1)

Before a data transmission is started, the mobile station initiates the making of a logical connection with the data network (PDP Context). The procedure used and the behavior of the network elements until the callup of the network transition node (GGSN) is in accordance with the 3GPP standard; see FIG. 1, steps 2-4, and the associated description.

According to the invention, in steps 5 and 6, FIG. 1, the network transition node GGSN 24 calls up authentication data and customer data, including the customer class, from billing and other database systems 25, such as RADIUS, MID-SD. In step 7, FIG. 1, the GGSN 24, on the basis of the customer class from a table 27 that can be configured by the network operator, ascertains the starting configuration, stored in memory, of the quality parameters for that customer. Next, the GGSN 24 forwards the newly determined quality parameters back to the switching node SGSN 22 (step 8, FIG. 1), which thereupon negotiates these quality parameters with the radio system RAN 21 (step 9, FIG. 1). During this negotiation portion, the RAN 21 makes a partial logical connection of the PDP Context, which is a Radio Access Bearer (RAB), to the mobile station 20. The outcome of the negotiation between RAN 21 and SGSN 22 represents the quality parameters (QoS class) finally negotiated for the logical connection (PDP Context), which the SGSN 22 imparts to the mobile station 20. Now, the actual data transfer between the mobile station 20 and a server is possible. In the following example, it will be assumed that for the data transfer, a QoS class called "interactive", with a priority of "3", or "IA3" for short, has been negotiated.

During the data transmission, the network transition node GGSN 24 inspects the arriving data packets and for each data packet ascertains the quality parameters (IP priority) employed, in accordance with a table 27 that is configurable by the network operator, in accordance with the ascertained service and the customer class. The sequence of this procedure is shown in FIGS. 4 and 5.

A data packet of QoS class "IA3", such as an email data packet 30, is to be delivered to the subscriber end unit 20 of a GPRS data network. The data packet 30 reaches a network transition node GGSN 25 of the data network (step 1, FIGS. 4 and 5). In the GGSN 24, an inspection of the data packet 30, and in particular of the packet header, takes place (step 2, FIGS. 4 and 5). It is found that the data packet 30 corresponds to the negotiated QoS class "IA3". According to the invention, the GGSN 24 now overwrites the IP TOS field, for instance, of the corresponding data packet 30 with the ascertained quality parameters "IA3" (IP priority) and forwards the altered data packet 30a to an applicable switching node SGSN 22 (step 3, FIGS. 4 and 5).

Figure 4:
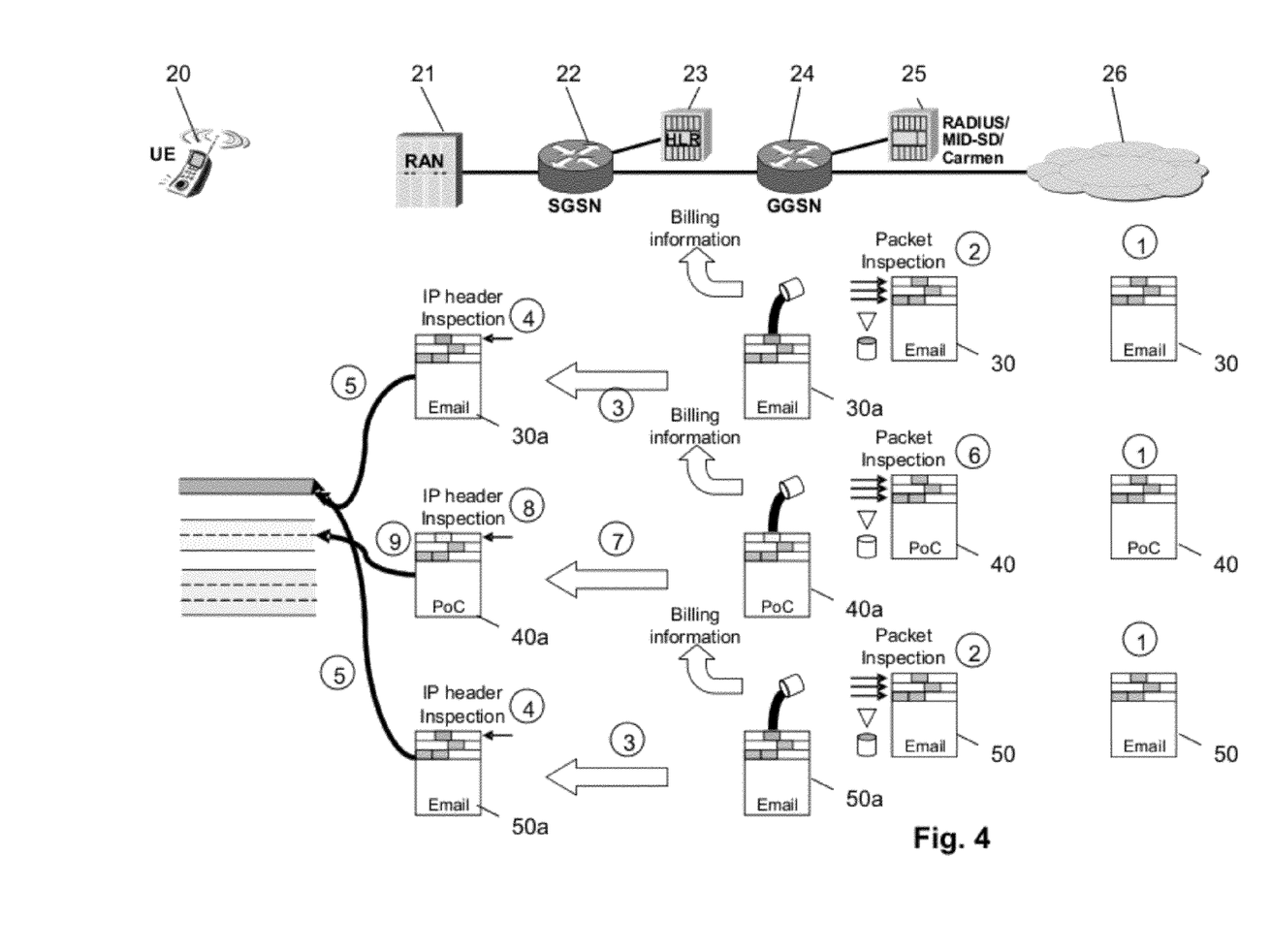
FIG. 4, basic sequence of a second exemplary embodiment of the invention (version b1)
Figure 5:
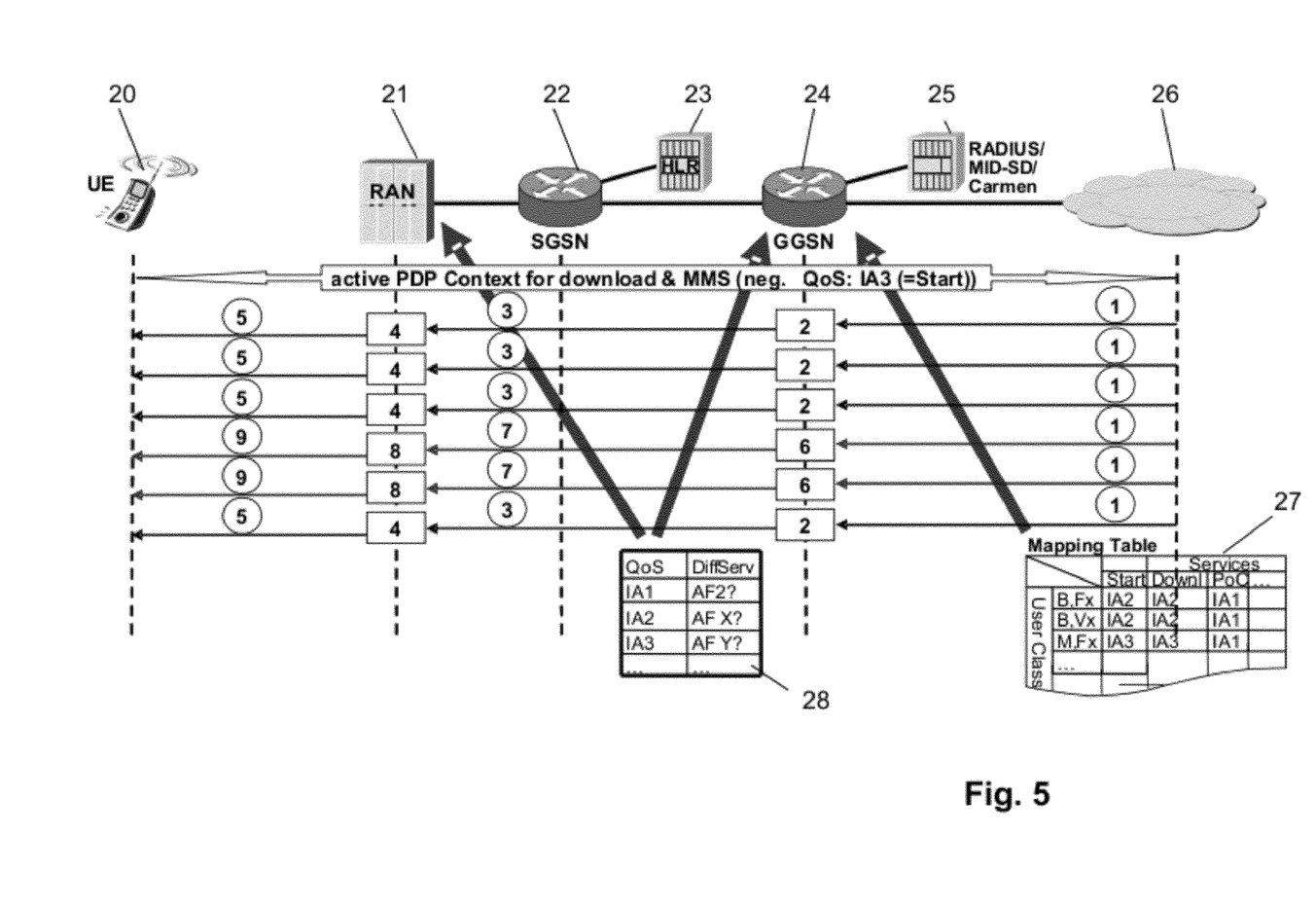
FIG. 5, signalling for version b1)

All the other network elements, such as the switching node SGSN 22 and in particular the resource control as well in the radio system RAN 21, evaluate the quality parameters written in by the GGSN 24 and use that information for controlling the data packet 30a (step 4, FIGS. 4 and 5). The control pertains to the prioritizing of the various packets for one mobile station 20 and the prioritizing of packets for various mobile stations. The data packet 30a is delivered to the end unit 20 in accordance with its QoS class (step 5, FIGS. 4 and 5).

A subsequent data packet of the QoS class "IA1", such as a PoC data packet 40, is to be delivered to the subscriber end unit 20. The data packet 40 reaches a network transition node GGSN 24 of the data network (step 1, FIGS. 4 and 5). In the GGSN 24, an inspection of the data packet 40, in particular of the packet header, takes place (step 6, FIGS. 4 and 5). It is found that the data packet 40 matches to the QoS class "IA1". According to the invention, the GGSN 24 now overwrites the IP TOS field, for instance, of the corresponding data packet 40 with the ascertained quality parameters "IA1" (IP priority) and forwards the altered data packet 40a to an applicable switching node SGSN 22 (step 7, FIGS. 4 and 5).

All the other network elements, such as the switching node SGSN 22 and in particular the resource control as well in the radio system RAN 21, evaluate the quality parameters written in by the GGSN 24 and use that information for controlling the data packet 30a (step 8, FIGS. 4 and 5). The control pertains to the prioritizing of the various packets for one mobile station 20 and the prioritizing of packets for various mobile stations. The data packet 30a is delivered to the end unit 20 in accordance with its QoS class (step 8, FIGS. 4 and 5).

The handling of the data packet 50 and the altered data packet 50a is done as for the data packets 30 and 30a.

The exemplary embodiment relates to the direction from the network to the end unit, but the opposite direction, that is, from the end device to the network, is also possible.

Exemplary Embodiment for Combination of Version a) and Version b1)

The individual steps in this exemplary embodiment can be taken from the description of versions a) and b1).

Before a data transmission is started, the mobile station initiates the making of a logical connection with the data network (PDP Context). The procedure used and the behavior of the network elements until the callup of the network transition node (GGSN) is in accordance with the 3GPP standard; see FIG. 1, steps 2-4.

According to the invention, in steps 5 and 6, FIG. 1, the network transition node GGSN 24 calls up authentication data and customer data, including the customer class, from billing and other database systems 25, such as RADIUS, MID-SD. In step 7, FIG. 1, the GGSN 24, on the basis of the customer class from a table 27 that can be configured by the network operator, ascertains the starting configuration, stored in memory, of the quality parameters for that customer. Next, the GGSN 24 forwards the newly determined quality parameters back to the switching node SGSN 22 (step 8, FIG. 1), which thereupon negotiates these quality parameters with the radio system RAN 21 (step 9, FIG. 1). During this negotiation portion, the RAN 21 makes a partial logical connection of the PDP Context, which is a Radio Access Bearer (RAB), to the mobile station 20. The outcome of the negotiation between RAN 21 and SGSN 22 represents the quality parameters (QoS class) finally negotiated for the logical connection (PDP Context), which the SGSN 22 imparts to the mobile station 20. Now, the actual data transfer between the mobile station 20 and a server is possible. In the following example, it will be assumed that for the data transfer, a QoS class called "interactive", with a priority of "3", or "IA3" for short, has been negotiated.

During the data transmission, the network transition node GGSN 24 inspects the data packets 30, 40, 50 and checks for possible criteria for a data flow determination. With the outcome of the checking, the GGSN 24, from a table 27 that is configurable by the network operator, determines the quality parameters to be used for the ascertained service and for the customer for the data packet. In accordance with version b1), the GGSN 24 overwrites the IP TOS field of the data packet with the ascertained QoS parameters (IP priority) and forwards the altered data packet 30a, 40a and 50a, onward. All the other network elements, such as the applicable switching node SGSN 22 and in particular the resource control in the radio system RAN 12, evaluate the quality parameters and use this information for controlling the packets. The control pertains to the prioritizing of the various packets for one mobile station and the prioritizing of packets for various mobile stations.

The sequence of this procedure is shown in FIGS. 4 and 5.

In addition, in each data packet, it is checked whether a change in the quality parameters for the logical connection, in accordance with version a), is necessary (see also FIGS. 2 and 3). This is done in such a way that the change in the quality parameters for the logical connection takes place only whenever it is absolutely compulsory, or in other words only if absolute quality parameters, such as guaranteed throughput rates, are changed. A hysteresis mechanism should be taken into account, to avoid oscillation events. The adaptation of the quality parameters for the logical connection takes place parallel to the further data transmission.

Exemplary Embodiment for Version b2)

Figure 6:
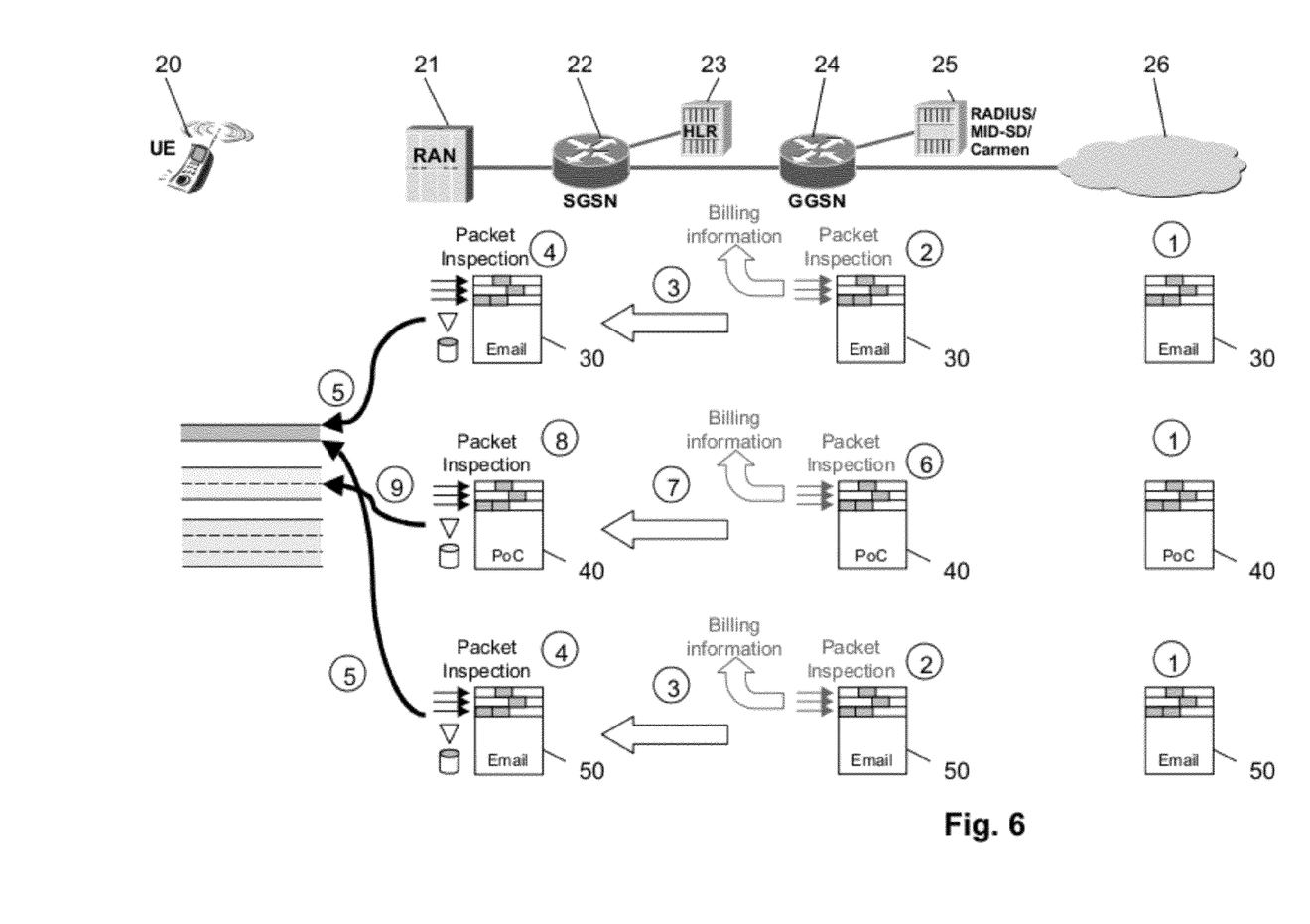
FIG. 6, basic sequence of a third exemplary embodiment of the invention (version b2)
Figure 7:
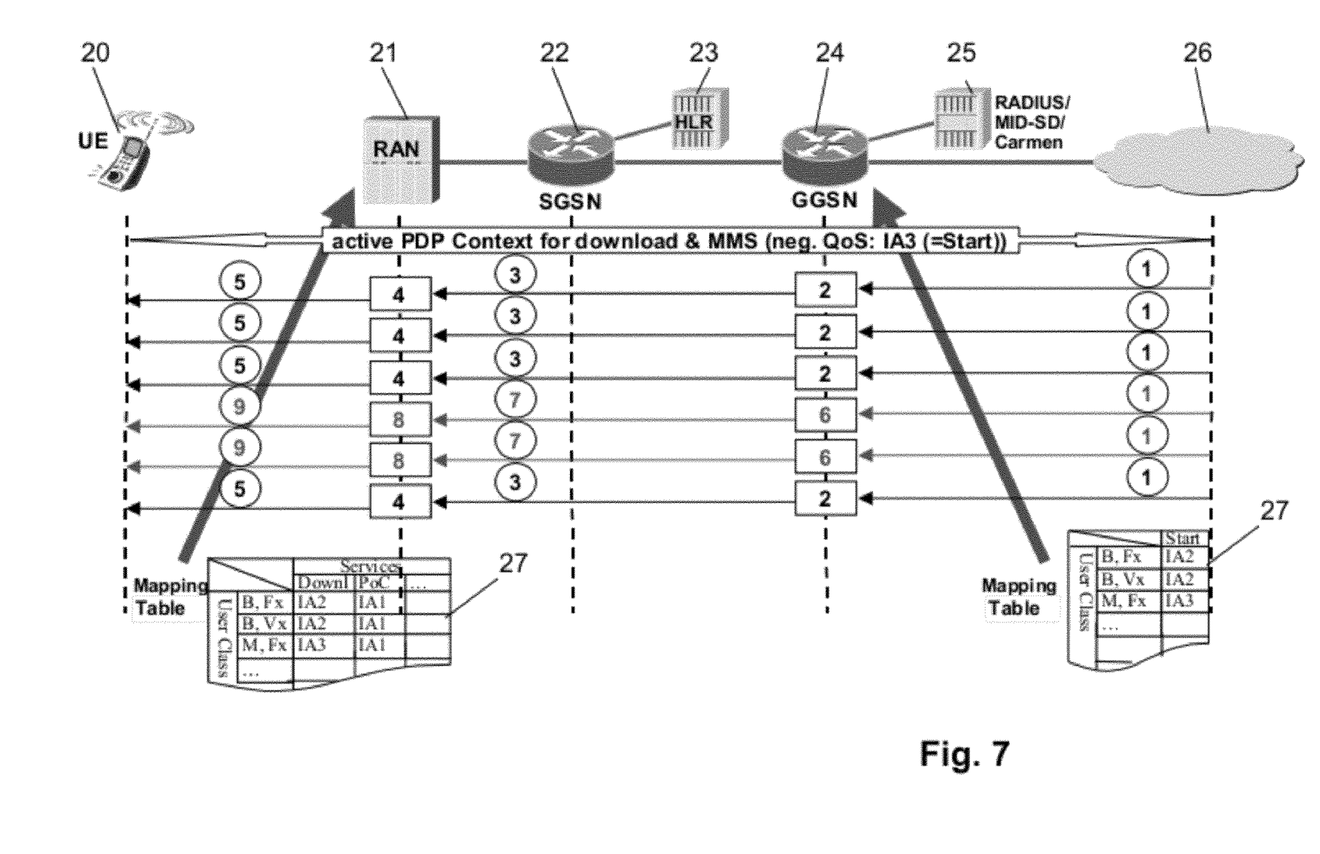
FIG. 7, signalling for version b2).

Version b2) shown in FIGS. 6 and 7 is basically equivalent to version b1) of FIGS. 4 and 5.

An identification of individual data packets within a packet connection is made, with the advantage that a compulsory change in the connection parameters for the entire data flow is not necessary. The identification arises from a classification which takes place independently in individual network elements or in each network element. The identification here is implementation-dependent. The IP TOS fields of the data packets are not overwritten.

LIST OF REFERENCE NUMERALS AND ABBREVIATIONS

1-9 Method steps (individual for each drawing figure)
20 End unit (E)
21 Radio system (RAN)
22 Switching node (SGSN)
23 Home location register (HLR)
24 Transition node (GGSN)
25 Database system (RADIUS, MID-SD)
26 IP network
27 Table
28 Table
30 Data packet (for instance, email)
40 Data packet (for instance, PoC)
50 Data packet (for instance, email)
UE User Equipment
RAN Radio Access Network
RAB Radio Access Bearer (radio interface)
SGSN Serving GPRS Support Node
HLR Home Location Register
GGSN Gateway GPRS Support Node
RADIUS Remote Authentication Dial-In User Service
PoC Push-to-talk over Cellular

The invention claimed is:

1. A method for controlling resources in system elements (20, 21, 22, 24) of a telecommunication system in the transmission of data packets (30, 40, 50) or data flows between the telecommunication network (21, 22, 24) and a subscriber end unit (20), comprising the steps of:
   inspecting, in at least one system element (20, 21, 22, 24), each arriving data packet (30, 40, 50),
   classifying each arriving data packet in accordance with its importance in a quality of service class,
   forwarding the classification of the quality of service class in accordance with the importance of the data packet by signalling to other system elements involved in the transmission, wherein on the basis of this signalling, the system elements involved perform a dynamic resource control of the transmission,
   controlling the connection and resources based on the properties of a logical packet connection in form of a Packet Data Protocol (PDP) Context and the identification of individual data packets within the packet connection,
   dynamically adapting the priorities based on the data packet identification, and inspecting in each data packet whether an additional adaptation of the quality parameters for the logical connection is necessary, wherein the additional adaptation is effected only when guaranteed quality parameters for the connection have changed,
   wherein rules for classifying a data packet or data flow in accordance with its importance are stored in memory in a set of rules (27) in the system element that is responsible for the inspection, the rules configured to differ between different quality of service classes,
   wherein rules for converting the signalled importance of a data packet or of a data flow in the involved system elements are stored in memory in a collection of guidelines (28), and
   wherein the set of rules (27) and the collection of guidelines (28) are configurable by a network operator with respect to the inspection, signaling, and conversion, in accordance with the ascertained service and the customer class.

2. The method as defined by claim 1, wherein the identification is defined by a classification that is performed in a system element and that is signalled to further network elements involved via an identification.

3. A method for controlling resources in system elements (20, 21, 22, 24) of a telecommunication system in the transmission of data packets (30, 40, 50) or data flows between the telecommunication network (21, 22, 24) and a subscriber end unit (20), comprising the steps of:
   inspecting, in at least one system element (20, 21, 22, 24), each arriving data packet (30, 40, 50), classifying each arriving data packet in accordance with its importance in a quality of service class, forwarding the classification of the quality of service class in accordance with the importance of the data packet by signalling to other system elements involved in the transmission, wherein on the basis of this signalling, the system elements involved perform a dynamic resource control of the transmission, controlling the connection and the resources based on the properties of a logical packet connection in form of a Packet Data Protocol (PDP) Context and the identification of individual data packets within the packet connection, dynamically adapting the priorities based on the data packet identification, and inspecting in each data packet whether an additional adaptation of the quality parameters for the logical connection is necessary, wherein the additional adaptation is effected only when guaranteed quality parameters for the connection has changed, wherein rules for classifying a data packet or data flow in accordance with its importance are stored in memory in a set of rules (27) in the system element that is responsible for the inspection, the rules configured to differ between different quality of service classes, wherein rules for converting the signalled importance of a data packet or of a data flow in the involved system elements are stored in memory in a collection of guidelines (28), and wherein the set of rules (27) and the collection of guidelines (28) are configurable by a network operator with respect to the inspection, signaling, and conversion, in accordance with the ascertained service and the customer class, and wherein the identification is defined by a classification that takes place independently in individual system elements or in each system element involved.

4. A method for controlling resources in system elements (20, 21, 22, 24) of a telecommunication system in the transmission of data packets (30, 40, 50) or data flows between the telecommunication network (21, 22, 24) and a subscriber end unit (20), comprising the steps of:

inspecting, in at least one system element (20, 21, 22, 24), each arriving data packet (30, 40, 50), classifying each arriving data packet in accordance with its importance in a quality of service class, forwarding the classification of the quality of service class in accordance with the importance of the data packet by signalling to other system elements involved in the transmission, wherein on the basis of this signalling, the system elements involved perform a dynamic resource control of the transmission, controlling the connection and the resources based on the properties of a logical packet connection in form of a Packet Data Protocol (PDP) Context and the identification of individual data packets within the packet connection, dynamically adapting the priorities based on the data packet identification, and inspecting in each data packet whether an additional adaptation of the quality parameters for the logical connection is necessary, wherein the additional adaptation is effected only when guaranteed quality parameters for the connection have changed, and wherein in the inspection of the data packet, its quality of service class or QoS class is determined, and on the basis of the quality of service class ascertained, an adaptation of the logical connection between the RADIUS system and the subscriber end unit to the quality of service class is performed.

5. A method for controlling resources in system elements (20, 21, 22, 24) of a telecommunication system in the transmission of data packets (30, 40, 50) or data flows between the telecommunication network (21, 22, 24) and a subscriber end unit (20), comprising the steps of:

inspecting, in at least one system element (20, 21, 22, 24), each arriving data packet (30, 40, 50), classifying each arriving data packet in accordance with its importance in a quality of service class, said classification taking place independently in at least one of said at least one system elements or in each system element involved, forwarding the classification of the quality of service class in accordance with the importance of the data packet by signalling to other system elements involved in the transmission, wherein on the basis of this signalling, the system elements involved perform a dynamic resource control of the transmission, controlling the connection and the resources based on the properties of a logical packet connection in form of a Packet Data Protocol (PDP) Context and the identification of individual data packets within the packet connection, dynamically adapting the priorities based on the data packet identification, and inspecting in each data packet whether an additional adaptation of the quality parameters for the logical connection is necessary, wherein the additional adaptation is effected only when guaranteed quality parameters for the connection have changed, and wherein in the inspection of the data packet, its quality of service class or QoS class is determined; the header of the data packet is overwritten with the quality of service class ascertained; and in the system elements involved, the written-in quality of service class is evaluated and used for controlling the data packet.

6. A method for controlling resources in system elements (20, 21, 22, 24) of a telecommunication system in the transmission of data packets (30, 40, 50) or data flows between the telecommunication network (21, 22, 24) and a subscriber end unit (20), comprising the steps of:

inspecting, in at least one system element (20, 21, 22, 24), each arriving data packet (30, 40, 50), classifying each arriving data packet in accordance with its importance in a quality of service class, forwarding the classification of the quality of service class in accordance with the importance of the data packet by signalling to other system elements involved in the transmission, wherein on the basis of this signalling, the system elements involved perform a dynamic resource control of the transmission, controlling the connection and the resources based on the properties of a logical packet connection in form of a Packet Data Protocol (PDP) Context and the identification of individual data packets within the packet connection, dynamically adapting the priorities via the data packet identification, and inspecting in each data packet whether an additional adaptation of the quality parameters for the logical connection is necessary, wherein the additional adaptation is effected only when guaranteed quality parameters for the connection has changed, and wherein in each system element involved the quality of service class or QoS class of the data packet is determined, and each system element uses the quality of service class ascertained for controlling the data packet in the forwarding to a different system element.

7. A telecommunication system with improved control of resources in system elements (20, 21, 22, 24) in the transmission of data packets (30, 40, 50) or data flows between the system elements (21, 22, 24) and a subscriber end unit (20), comprising:

inspection means, present in at least one system element (20, 21, 22, 24), for inspecting each arriving data packet (30, 40, 50) and for classifying the data packet in accordance with its importance in a quality of service class, means for signalling the classification of the data packet in accordance with the importance to other system elements and involved in the transmission, and means in the system elements involved for performing a dynamic resource control of the transmission, on the basis of this signalling, by controlling the connection and the resources based on the properties of a logical packet connection in form of a Packet Data Protocol (PDP) Context and the identification of individual data packets within the packet connection, and dynamically adapting the priorities via the data packet identification, and inspecting in each data packet whether an additional adaptation of the quality parameters for the logical connection is necessary, wherein the additional adaptation is effected only when guaranteed quality parameters for the connection has changed, a non-transitory memory located in the system element that is responsible for the inspection, for storing a set of rules (27) for classifying a data packet or data flow in accordance with its importance, and a collection of guidelines (28) providing rules for converting the signalled importance of a data packet or of a data flow in the involved system elements, the rules configured to differ between different quality of service classes, and wherein the set of rules (27) and the collection of guidelines (28) are configurable by a network operator with respect to the inspection, signaling, and conversion, in accordance with the ascertained service and the customer class.

* * * * *